F. C. HANKER.
FLASH-OVER SUPPRESSING MEANS FOR ROTARY CONVERTER SYSTEMS.
APPLICATION FILED JUNE 17, 1918. RENEWED NOV. 23, 1920.
1,392,052.
Patented Sept. 27, 1921.
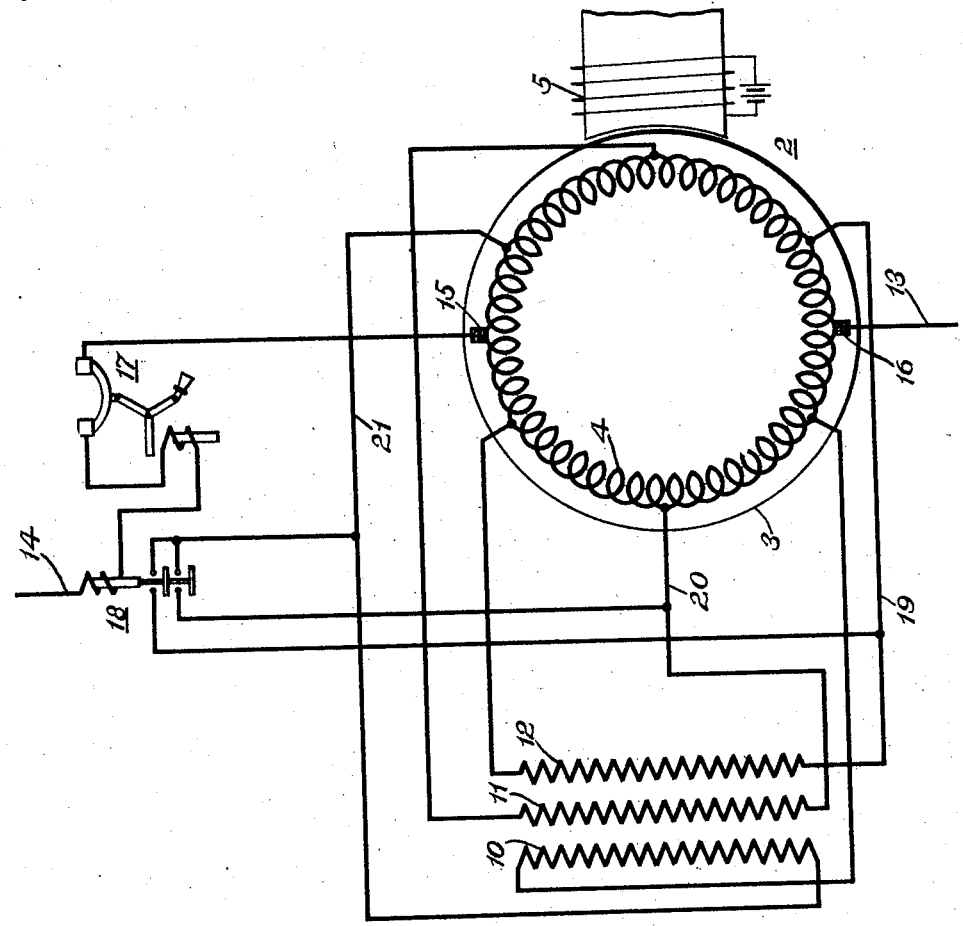
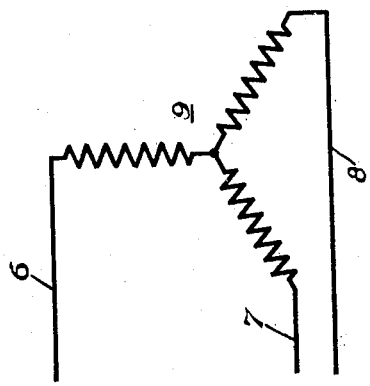
WITNESSES:
W. S. Reece
O. C. Davis
INVENTOR
Frederic C. Hanker
BY
Wesley G. Carr
ATTORNEY

UNITED STATES PATENT OFFICE.

FREDERIC C. HANKER, OF WILKINSBURG, PENNSYLVANIA, ASSIGNOR TO WESTINGHOUSE ELECTRIC AND MANUFACTURING COMPANY, A CORPORATION OF PENNSYLVANIA.

FLASH-OVER-SUPPRESSING MEANS FOR ROTARY-CONVERTER SYSTEMS.

1,392,052.   Specification of Letters Patent.   Patented Sept. 27, 1921.

Application filed June 17, 1918, Serial No. 240,284. Renewed November 23, 1920. Serial No. 426,103.

*To all whom it may concern:*

Be it known that I, FREDERIC C. HANKER, a citizen of the United States, and a resident of Wilkinsburg, in the county of Allegheny and State of Pennsylvania, have invented a new and useful Improvement in Flash-Over-Suppressing Means for Rotary-Converter Systems, of which the following is a specification.

My invention relates to means for minimizing or preventing commutator flash-overs in rotary-converter systems, and it has for its object to provide a system of the character designated wherewith the desired result may be secured in a simple, effective and inexpensive manner.

The single figure of the accompanying drawing is a diagrammatic view of a rotary converter, together with associated supply and load circuits and auxiliary apparatus, embodying a preferred form of my invention.

In a copending application of N. W. Storer, Serial No. 203,527, filed Nov. 23, 1917, and assigned to the Westinghouse Electric & Manufacturing Company, is described and claimed means operative to interconnect a plurality of points in the armature winding of a direct-current generator in the event of abnormal current flow therefrom, whereby the magnetically stored energy of the armature winding is immediately dissipated, the field magnetism is neutralized and the tendency to flash-overs minimized.

In a copending application of N. W. Storer, Serial No. 222,083, filed March 13, 1918, and assigned to the Westinghouse Electric & Manufacturing Company, is described and claimed the application of similar means to a rotary converter for a similar purpose.

In a copending application of N. W. Storer, Serial No. 246,758, filed July 25, 1918, and assigned to the Westinghouse Electric & Manufacturing Company, is disclosed a system of the character designated wherein, particularly in rotary converter systems embodying supply transformers having relatively large reactance, an interconnection is established directly between two or more supply leads connecting the transformer and the rotary converter, whereby the magnetically stored energy, both of the transformer and of the rotary converter, is promptly dissipated, thus minimizing flash-overs to a marked degree. The inherent reactance of the transformer protects the primary supply leads from an abnormal rush of current until such time as protective apparatus can come into operation and disconnect the system.

I find that, in certain cases, the method of interconnection described in the last-mentioned application is too pronounced in its action, in that short-circuit paths of too low impedance are formed, resulting in the flow of excessive circulating currents, with consequent damage to the windings and associated apparatus.

I find that, with the usual, six-phase, diametrical system of connections for rotary converters, as widely employed in present practice, three points in the supply leads having a relative phase displacement of 120° may be interconnected, placing an absolute short-circuit upon the converter winding but not an absolute short-circuit upon the secondary windings of the transformer, the latter windings being short-circuited only through portions of the armature winding of the converter. In this manner, the circulating currents, serving to damp out the magnetically stored energy of the supply transformer, are maintained at a reasonable value, and the disastrous effects of the flow of abnormal currents are avoided.

Referring to the drawing for a more detailed understanding of my invention, I show a rotary converter at 2 embodying an armature 3 provided with a winding 4 and further provided with an exciting field system 5.

Energy for the operation of the converter 2 is derived from suitable supply leads 6, 7 and 8 through a supply transformer 9 having three non-interconnected secondary windings 10, 11 and 12. The secondary windings 10, 11 and 12, in turn, are connected to points in the armature winding 4 having a relative phase displacement of 60 electrical degrees, in accordance with the well known and widely described diametrical system of connections, the terminals of any given secondary phase winding being connected to points in the armature winding 180 electrical degrees apart. The last-named connection is, of course, established through suitable slip rings and taps but, for simplicity and clearness, I have shown the supply leads for the converter as attached directly to the armature winding 4, in accordance with common drafting practice.

Direct current is derived from the armature winding 4 through a suitable commutator and supplied to direct-current leads 13 and 14, the commutator being indicated by brushes 15 and 16, shown as bearing directly upon the winding 4, in order to still further simplify and clarify the disclosure.

A direct-current circuit-breaker 17, of any desired form, is inserted in the lead 14 as is also the actuating winding of a relay-type switching device 18 arranged, when closed, to interconnect three of the supply leads 19, 20 and 21, connected respectively to points having a relative phase displacement of 120° in the winding 4.

The switching device 18 is preferably quick-acting in design, that is to say, a low-resistance interconnection should be established well within the period required for a point in the armature winding 4 to travel through 180 electrical degrees or from a positive brush to a negative brush.

Having thus described the arrangement of a system embodying my invention, the operation is as follows. Let it be assumed that the load current rises to such a value as to close the switch 18. The leads 19, 20 and 21 are at once interconnected, thus interconnecting points having a relative phase displacement of 120 electrical degrees in the armature winding 4 and promptly dissipating the stored energy of the rotary converter, as fully described in the aforementioned Storer applications.

At the same time, it will be noted that the terminals of any given transformer secondary winding 10, 11 or 12 are not directly interconnected and thus undesirably large currents are not permitted to flow in the transformer 9. Starting from the point of interconnection of the leads 19, 20 and 21 and traversing any one of the secondary windings, it is necessary to traverse that portion of the armature winding 4 corresponding to sixty electrical degrees to again reach the point of interconnection of the supply leads. Thus, in effect, each of the transformer secondary windings is short-circuited through sixty electrical degrees of the armature winding and the impedance of this portion of the armature winding prevents the flow of excessive currents.

In due course of time, the circuit-breaker 17 opens, causing the opening of the switch 18 and the removal of the short-circuit condition.

The invention is clearly not limited to six-phase converters but broadly speaking with an $n$-phase converter, where $n$ is an even number greater than 2, the points in the supply means which are to be interconnected will be those having currents with a relative phase displacement of $\frac{720°}{n}$.

My invention contemplates the provision of only such apparatus as is necessary to prevent the initiation and maintenance of flash-overs but, if desired, suitable means may be applied to the system for automatically replacing it in operation or for the automatic opening of the field circuit thereof, all as described and shown in the aforementioned Storer applications.

The system herein shown contemplates the interconnection of points in the armature winding having an exact 120° phase displacement from each other but it is wholly non-essential for the successful operation of the system described that an exact 120° phase relationship be chosen for the points of interconnection, this being merely the most convenient form of connection with the commercial converter. Obviously, by the interconnection of any points in the winding having a mutual relation such that a direct short-circuit is imposed upon the armature winding and an indirect short-circuit is imposed upon the secondary winding of the supply transformers through portions of the armature winding, similar and sufficiently satisfactory results may be secured.

While I have shown my invention in its preferred form, it will be obvious to those skilled in the art that it is not so limited but is susceptible of various minor changes and modifications without departing from the spirit thereof and I desire, therefore, that only such limitations shall be placed thereon as are imposed by the prior art or are specifically set forth in the appended claims.

I claim as my invention:

1. The combination with a rotary-converter, of means for supplying $n$-phase alternating currents thereto, $n$ being an even number greater than 2, a load-circuit connected thereto, and means for interconnecting points in said supply means having currents with a relative phase-displacement of $\frac{720°}{n}$ upon the occurrence of abnormal current flow in said load circuit.

2. The combination with a rotary-converter, of means for supplying six-phase alternating currents thereto, a load-circuit connected thereto, and means for interconnecting points in said supply means having currents with a relative phase-displacement of substantially 120°, upon the occurrence of abnormal current flow in said load circuit.

3. The combination with a rotary-converter, of a transformer arranged to supply $n$-phase alternating currents thereto, $n$ being an even number greater than 2, a load-circuit connected to said converter, and means for interconnecting points in the polyphase circuit between said transformer and said converter having currents with a relative phase displacement of $\frac{720°}{n}$ upon the occurrence of abnormal current flow in said load circuit.

4. The combination with a rotary-converter, of a transformer arranged to supply six-phase alternating currents thereto, a load-circuit connected to said converter, and means for interconnecting points in the polyphase circuit between said transformer and said converter, having currents with a relative phase-displacement of 120°, upon the occurrence of abnormal current flow in said load circuit.

5. The combination with a rotary-converter, of a supply transformer diametrically connected for the supply of six-phase currents thereto, direct-current brushes mounted to derive current from said converter and to supply said current to a load-circuit, and a short-circuiting device arranged to interconnect points in said supply circuit having currents with a relative phase-displacement of substantially 120° upon the occurrence of a predetermined abnormal current in said load circuit, said device being so quick-acting as to establish said short-circuit in less time than is required for the passage of a point in the converter winding from maximum potential to positive negative potential.

6. The combination with a rotary-converter, of a supply transformer diametrically connected to the supply of six-phase currents thereto, direct-current brushes mounted to derive current from said converter and to supply said current to a load-circuit, a short-circuiting device arranged to interconnect points in said supply circuit having currents with a relative phase displacement of substantially 120° upon the occurrence of a predetermined abnormal current in said load circuit, said device being so quick-acting as to establish said short-circuit in less time than is required for the passage of a point in the converter winding from maximum positive potential to maximum negative potential, and a relatively slow-acting circuit-breaker in said load-circuit and adjusted to open said circuit with the same predetermined abnormal current.

7. The combination with a dynamo-electric machine having a six-phase armature winding, of a six-phase translating device connected thereto for interchange of power therewith, and quick-acting means for interconnecting points on said armature having currents with a relative phase-displacement of 120° upon the occurrence of a predetermined abnormal current.

8. The combination with a dynamo-electric machine having an $n$-phase armature winding, $n$ being an even number greater than 2, of an $n$-phase translating device connected thereto for interchange of power therewith, and quick-acting means for interconnecting points on said armature having currents with a relative phase-displacement of $\frac{720°}{n}$ upon the occurrence of a predetermined abnormal current.

9. The combination with a dynamo-electric machine of the rotary-converter type, said machine having an armature winding connected to slip-rings and a commutator member, of symmetrical polyphase terminal-leads connected to said slip rings adapted for connection to a symmetrical polyphase translating device, and means connected to said slip rings for short-circuiting a plurality of symmetrical points on said armature winding, said points being different from the symmetrical points to which said terminal leads are connected.

10. The combination with a dynamo-electric machine having an armature winding, of a translating device connected to symmetrical points on said armature winding, and means for short-circuiting a different number of symmetrical points on said armature winding, said groups of symmetrical points and said translating device being so chosen that no portion of the latter is directly short-circuited by said means.

In testimony whereof, I have hereunto subscribed my name this 29th day of May, 1918.

FREDERIC C. HANKER.